Patented Nov. 20, 1945

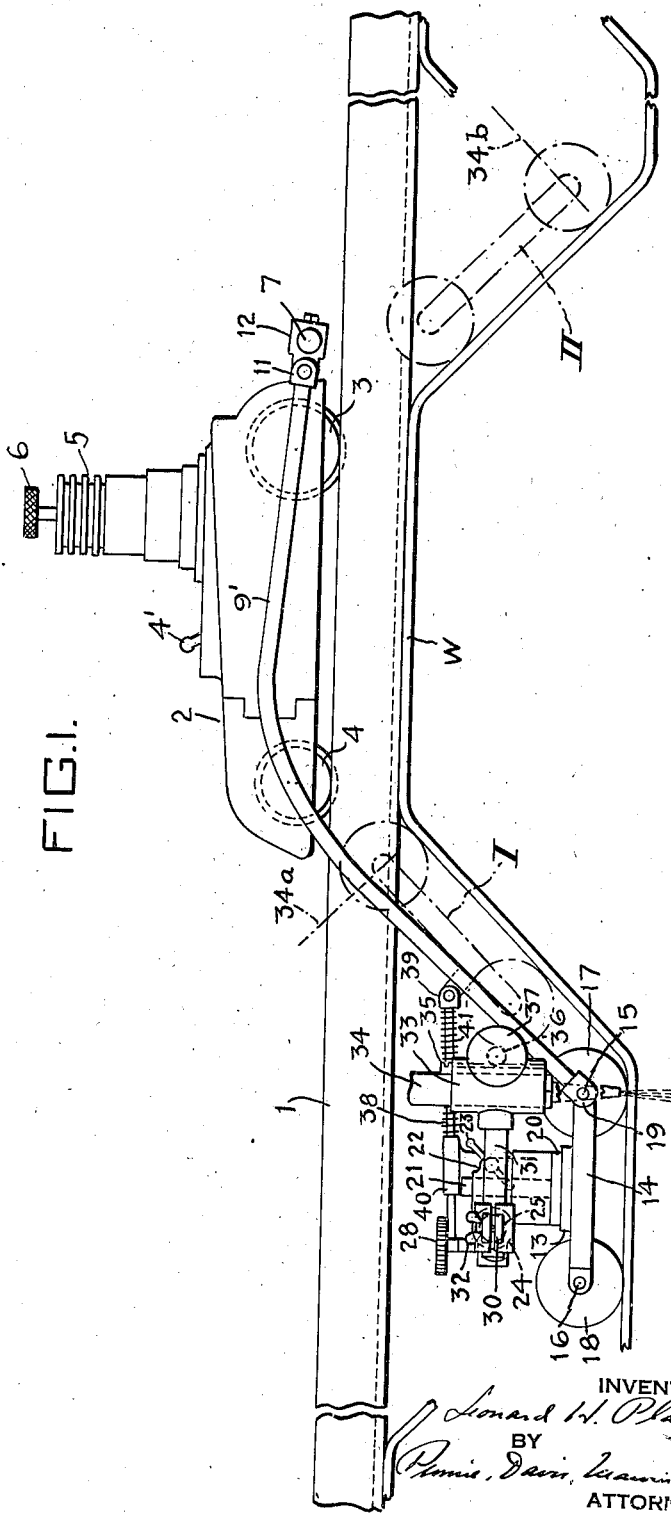

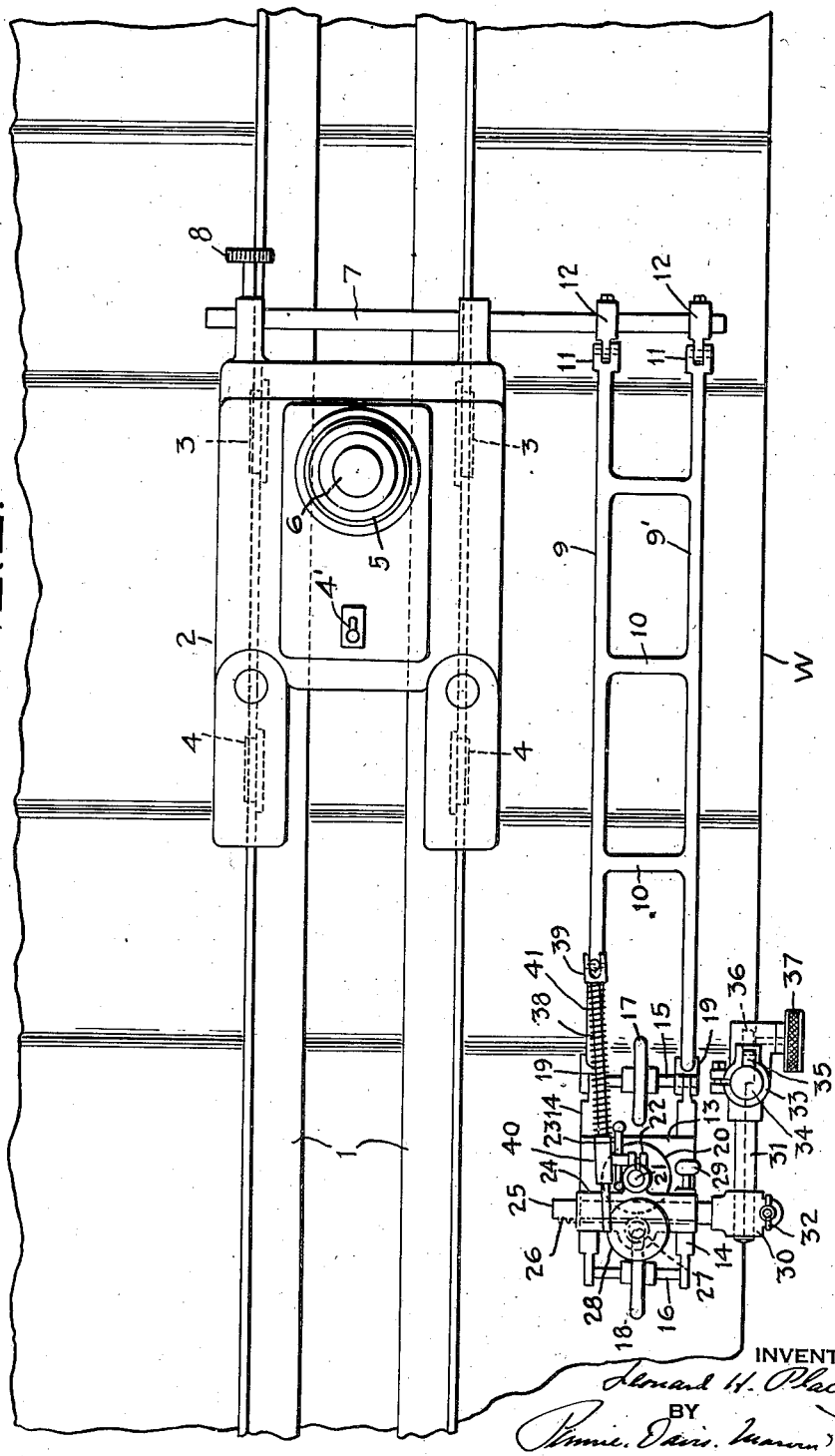

2,389,239

UNITED STATES PATENT OFFICE 2,389,239

APPARATUS FOR CUTTING CORRUGATED PLATES AND THE LIKE

Leonard H. Place, Huber, Oreg., assignor to Air Reduction Company, Incorporated, a corporation of New York Application June 3, 1943, Serial No. 489,438

7 Claims. (Cl. 266—23)

This invention relates to apparatus for cutting metal by means of gas cutting torches, and more particularly to apparatus for cutting metal work-pieces having an irregular contour.

The apparatus is intended primarily for cutting corrugated metal plates such as those used for metal piling and in the construction of certain types of bulkheads for cargo ships, although it may also be used for cutting work-pieces of other shapes.

For most effective transverse cutting of the corrugated plate the tip of the cutting torch should be maintained at a uniform distance from the surface of the plate as the torch is traversed across the plate, and the oxygen jet should remain substantially normal to the plate surface as the torch moves up and down the side walls of the corrugations and across the top and bottom of them. Therefore the cutting torch, which is vertically disposed during its travel across the top and bottom portions of the corrugations, must slope forwardly while traveling down a side wall of a corrugation and slope rearwardly while traveling up a side wall of a corrugation. So far as I am aware, in all of the machines heretofore proposed for moving a cutting torch over an undulating or irregular surface and keeping its tip at a uniform distance from the surface, the torch has been maintained in a vertical position at all times. My machine differs from such machines in this and the other respects hereinafter made clear.

According to the invention, the apparatus comprises a self-propelled carriage adapted to move, at a uniform speed corresponding to the desired cutting speed of the torch, along a track extending transversely of the corrugations of the plate to be cut and supported by and spanning their crests. A trailer carriage, or torch support, having front and rear wheels is towed by the main carriage by an arm pivoted at its forward end to the main carriage and at its rear end to the forward part of the trailer carriage. The wheels of the trailer carriage run directly on the surface of the corrugated plate. The cutting torch is supported by the trailer carriage in substantially an upright position and is capable of various adjustments, including one by which the cutting jet can be brought into substantial transverse alignment with the point of contact of the front wheel or wheels of the trailer carriage with the surface of the plate. When the main carriage is moved along its track in substantially a horizontal plane, the trailer carriage is towed up and down the side walls of the corrugations and across the top and bottom of the corrugations. Since the trailer carriage is free to change its fore and aft inclination as it is towed across the corrugations and since the axis of the torch remains at right angles to the longitudinal axis of the trailer carriage, the torch will slope forwardly when traveling down hill and will slope rearwardly when traveling up hill and will remain vertical when the trailer carriage is horizontally supported. Since the torch tip is substantially in transverse alignment with the point of contact between the front wheel or wheels of the trailer carriage and the surface of the plate it will remain at a substantial uniform distance from the surface of the work.

One form of apparatus constructed in accordance with the invention is illustrated in the accompanying drawings, in which:

Figure 1 is a side elevation of the apparatus; and

Fig. 2 is a plan view of the apparatus shown in Fig. 1.

The work-piece, designated W in the drawings, represents a corrugated plate of the kind above referred to. The corrugations of this type of plate are of the flattened kind having flat horizontal tops and bottoms and flat inclined side walls. A track 1 is laid on the plate so that it extends transversely of the corrugations and spans the crests and is supported on the flat tops of the corrugations. The towing carriage which is adapted to run on the track 1 is shown at 2. This carriage may be of a well-known self-propelled type driven by an electric motor provided with an adjustable centrifugal speed governor. A carriage of this type is disclosed in the patent to J. L. Anderson, No. 1,811,835. For the present purpose it is sufficient to note that the carriage has front wheels 3 and rear wheels 4 which may be either flanged or grooved to guide the carriage on the rails of the track 1. The front wheels 3 are traction wheels while the rear wheels 4 are trailing wheels which are not motor driven. The traction wheels 3 are driven by an electric motor (not shown) controlled by an electric switch 4' on the carriage. The motor has a centrifugal speed governor 5 which may be adjusted by means of a knob 6 to cause the motor to propel the carriage along the track at the desired uniform speed.

A rod 7 is mounted at the forward end of the carriage to extend transversely thereof and project beyond one side of the carriage, as shown in Fig. 2. The rod may be adjusted longitudinally of itself and transversely of the carriage and clamped in adjusted position by turning a knob 8. The projecting end of the rod has pivotally connected to it the forward end of a tow-arm which extends rearwardly some distance to the trailer carriage on which the cutting torch is supported. In the particular embodiment of the invention illustrated in the drawings the tow-arm is a skeleton frame having side members 9 and 9' interconnected by cross-members 10 (Fig. 2). The forward end of each of the side members 9 and 9' is provided with a clevis 11 which is pivotally connected to a block or sleeve 12 fastened to the projecting end of the rod 7 on the towing carriage.

The trailer carriage comprises a cross-piece or platform 13 supported by longitudinal side sills 14. The side sills are supported on front and rear axles 15 and 16 on which are mounted front and rear wheels 17 and 18. The wheels 17 and 18 run directly on the surface of the corrugated plate. A single pair of wheels, one at the front of the trailer carriage and one at the rear thereof, is sufficient because of the manner in which the tow-arm gives lateral support to the trailer carriage although two wheels may be mounted on each axle if desired. The rear end of each of the side members 9, 9' of the tow-arm is pivotally connected to the front axle 15 of the trailer by means of a clevis 19 the arms of which straddle the forward end of the corresponding side sill 14.

The platform 13 of the trailer carriage supports a plate 20 having a vertical post 21. A split clamp 22 (Fig. 2) is adjustably attached to the post 21 and is clamped in position by means of a handle 23. The clamp 22 supports a bearing sleeve 24 in which a transversely extending rod 25 is adapted to slide. The rod 25 is provided with rack teeth 26 which mesh with a pinion 27 rotatably supported by the bearing sleeve 24 and adapted to be rotated by a knob 28. The rotation of the knob 28 thus adjusts the rod 25 longitudinally of itself and transversely of the trailer carriage. The rod 25 may be clamped in its adjusted position by turning a thumb-screw 29 (Fig. 2). The outer end of the rod 25 carries a split clamp 30 which adjustably receives the rear end of a rod 31 which extends parallel to the longitudinal axis of the trailer carriage. The rod 31 may be adjusted longitudinally of itself in the clamp 30 and clamped in its adjusted position by tightening a thumb nut 32. The forward end of the rod 31 carries a torch holder 33 in which a cutting torch 34, such as an oxyacetylene cutting torch, is mounted in substantially an upright position. The torch is provided with rack teeth 35 meshing with a pinion 36 (Fig. 2) rotatably supported in the torch holder and adapted to be turned by a knob 37 to adjust the torch longitudinally in the holder in a manner well understood in the art.

The rod 31 is of such length and is so adjusted that the tip of the cutting torch is substantially in transverse alignment with the axis of the front axle of the trailer carriage and with the point of contact of the front wheel with the surface of the plate as shown in the drawings.

It will now be seen that as the towing carriage 2 moves along its track the trailer carriage is towed at a sufficient distance behind it to allow the trailer carriage to travel freely up and down the sides of the corrugations and along the bottoms and tops thereof, the wheels 17 and 18 always supporting the trailer carriage on the surface of the plate. When the trailer carriage is supported on a flat bottom or top of one of the corrugations the cutting torch is substantially vertical as shown in Fig. 1. The axis of the torch always remains substantially at right angles to the longitudinal axis of the trailer carriage and therefore when the trailer carriage is being towed up a side wall of a corrugation and is in a position I indicated by broken lines in Fig. 1, the axis of the cutting torch slopes rearwardly as represented at 34a. Likewise, when the trailer carriage is moving down a side wall of a corrugation and is in a position II indicated by the broken lines at the right of Fig. 1, the axis of the torch slopes forwardly as represented at 34b. Since the tip of the cutting torch is substantially in transverse alignment with the point of contact of the front wheel of the trailer carriage with the surface of the plate it is always maintained at substantially a uniform distance from the plate surface. The distance that the tip of the torch is spaced from the surface of the plate depends upon the longitudinal adjustment of the torch in its holder effected by turning of the knob 37. Forward and rearward adjustment of the torch is effected by adjusting the torch supporting rod 31 in the split clamp 30, while transverse adjustment of the torch to adjust it toward or from the trailer carriage is effected by turning the knob 28 to shift the rod 25 longitudinally in the sleeve 24.

In order to prevent the trailer carriage from tipping over frontwardly when travelling down the side wall of a corrugation, there is provided a rod 38 which is pivotally connected at its forward end to the tow arm by a clevis 39. The rear end portion of the rod 38 slides in a bearing 40 supported by the trailer carriage. A coil spring 41 surrounds the rod 38 and is interposed between the clevis 39 and bearing 40. When the trailer carriage is travelling down hill the angle between the longitudinal axis of the trailer carriage and the upwardly extending rear end portion of the tow arm is decreased and the coil spring 41 is therefore compressed between the clevis 39 and the bearing 40. Thus the trailer carriage is prevented by the coil spring from tilting over forwardly. No special precaution is necessary to keep the trailer carriage from tilting over backwardly while travelling up hill because the center of gravity of the torch and its supporting structure is nearer the front wheel than the rear wheel.

The cutting torch may be of a well known type and therefore is not shown in its entirety in the drawings. Oxygen, and fuel gas such as acetylene, are conducted to the torch by means of hoses in the usual way, which likewise are not shown in the drawings.

While the drawings show the work-piece to be a corrugated metal plate and while the apparatus is particularly adapted for cutting that kind of work-piece, it will be understood that it can be used for cutting work-pieces of other shapes.

I claim:

1. In apparatus for cutting corrugated plates or other work-pieces of irregular contour including a self-propelled towing carriage adapted to move along a track, a trailer carriage adapted to run directly on the surface of the work-piece and to be towed by the towing carriage, a gas cutting torch mounted on the trailer carriage, and connecting means between the towing carriage and the trailer carriage; the improvement which comprises the mounting of the gas cutting torch on the trailer carriage so that its axis is substantially vertical when the longitudinal axis of the trailer carriage is horizontal and the tip thereof is substantially in transverse alignment with the front axle of the trailer carriage, and a pivotal connection for said connecting means, whereby the longitudinal axis of the trailer carriage may move out of a horizontal plane and assume a forward or rearward inclination to accommodate itself to the inclination of sloping portions of the surface of the work-piece over which the trailer carriage is moved and the axis of the torch assumes a position normal to any sloping portion of the surface of the work-piece on which the trailer carriage is supported, with the tip thereof maintaining at all times a substantially uniform distance from the work-piece.

2. An apparatus for cutting corrugated plates or other work-pieces of irregular contour as set forth in claim 1 in which the connecting means between the towing carriage and the trailer carriage is a tow-arm pivoted about a horizontal axis to the trailer carriage.

3. An apparatus for cutting corrugated plates or other work-pieces of irregular contour as set forth in claim 1 in which the connecting means between the towing carriage and the trailer carriage is a tow-arm pivoted about a horizontal axis to the front axle of the trailer carriage.

4. An apparatus for cutting corrugated plates or other work-pieces of irregular contour as set forth in claim 1 in which the connecting means between the towing carriage and the trailer carriage is a tow-arm pivoted about a horizontal axis to the trailer carriage, and which includes means functioning when the trailer carriage is travelling down an inclined portion of the surface of the work-piece to prevent the trailer carriage from tipping frontwards.

5. An apparatus for cutting corrugated plates or other work-pieces of irregular contour as set forth in claim 1 in which the connecting means between the towing carriage and the trailer carriage is a tow-arm pivoted about a horizontal axis to the trailer carriage, and in which a rod extends between the tow-arm and trailer carriage and a coil spring surrounds the rod and exerts a pressure against the trailer carriage to prevent it from tipping over frontwards when it is travelling down an inclined surface of the work-piece and the angle between the longitudinal axis of the trailer carriage and the portion of the tow-arm from which the rod extends is decreased.

6. In apparatus for cutting corrugated plates or other work-pieces of irregular contour including a self-propelled towing carriage adapted to move along a track, a trailer carriage adapted to run directly on the surface of the work-piece and to be towed by the towing carriage, a gas cutting torch mounted on the trailer carriage, and connecting means between the towing carriage and the trailer carriage; the improvement in which the connecting means are pivotally connected to the trailer carriage and means are interposed between the connecting means and the trailer carriage functioning when the trailer carriage is travelling down an inclined portion of the surface of the work-piece to prevent the trailer carriage from tipping frontwards.

7. In apparatus for cutting corrugated plates or other work-pieces of irregular contour including a self-propelled towing carriage adapted to move along a track, a trailer carriage adapted to run directly on the surface of the work-piece and to be towed by the towing carriage, a gas cutting torch mounted on the trailer carriage, and a tow-arm connecting the towing carriage and the trailer carriage; the improvement which comprises a rod extending between the tow-arm and the trailer carriage, and a coil spring surrounding the rod and exerting a pressure against the trailer carriage to prevent it from tipping over frontwards when it is travelling down an inclined surface of the work-piece and the angle between the longitudinal axis of the trailer carriage and the portion of the tow arm from which the rod extends is decreased.

LEONARD H. PLACE.